(12) United States Patent
Spangler et al.

(10) Patent No.: US 10,343,573 B2
(45) Date of Patent: Jul. 9, 2019

(54) VEHICLE SEAT ASSEMBLY HAVING A RESET DEVICE

(71) Applicant: Brose Fahrzeugteile GmbH & Co. KG, Coburg, Coburg (DE)

(72) Inventors: Martin Spangler, Laaber (DE); Sebastian Meyer, Coburg (DE); Andreas Prause, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 192 days.

(21) Appl. No.: 15/529,455

(22) PCT Filed: Dec. 15, 2015

(86) PCT No.: PCT/EP2015/079819
§ 371 (c)(1),
(2) Date: Jul. 17, 2017

(87) PCT Pub. No.: WO2016/096873
PCT Pub. Date: Jun. 23, 2016

(65) Prior Publication Data
US 2017/0355289 A1    Dec. 14, 2017

(30) Foreign Application Priority Data
Dec. 19, 2014 (DE) .................. 10 2014 226 642

(51) Int. Cl.
*B60N 2/22* (2006.01)
*B60N 2/90* (2018.01)
(Continued)

(52) U.S. Cl.
CPC ............. *B60N 2/933* (2018.02); *B60N 2/206* (2013.01); *B60N 2/22* (2013.01); *B60N 2/3011* (2013.01); *B64D 11/064* (2014.12)

(58) Field of Classification Search
CPC .......... B60N 2/933; B60N 2/206; B60N 2/22; B60N 2/3011; B64D 11/064
(Continued)

(56) References Cited

U.S. PATENT DOCUMENTS

| 3,024,067 A | 3/1962 | Brandoli |
| 3,205,009 A * | 9/1965 | Herider .................. A47C 7/462 267/110 |

(Continued)

FOREIGN PATENT DOCUMENTS

| CN | 1257943 A | 6/2000 |
| CN | 1311356 A | 9/2001 |

(Continued)

OTHER PUBLICATIONS

English translation of First Chinese Office action dated Sep. 19, 2018, 1 page.

(Continued)

*Primary Examiner* — Mark R Wendell
(74) *Attorney, Agent, or Firm* — Lewis Roca Rothgerber Christie LLP

(57) ABSTRACT

A vehicle seat assembly, comprising a first seat component and a second seat component, is provided. The second seat component is adjustable relative to the first seat component—preferably about a pivot axis—and a resetting device is provided, by means of which a resetting force is exerted on the second seat component in direction of a neutral position, when the second seat component is adjusted with respect to the neutral position. The resetting device at least includes the following:—a spring element in which a portion is rotated about an axis of rotation, when the second seat component is adjusted with respect to its neutral position, and the spring element thereby is tensioned, so that via the (Continued)

tensioned spring element at least a part of the resetting force is provided, and—a force transmission element.

19 Claims, 11 Drawing Sheets

(51) Int. Cl.
  *B60N 2/20* (2006.01)
  *B60N 2/30* (2006.01)
  *B64D 11/06* (2006.01)
(58) Field of Classification Search
  USPC .............. 297/378.1, 344.12, 344.13, 344.15
  See application file for complete search history.

(56) References Cited

U.S. PATENT DOCUMENTS

| | | | |
|---|---|---|---|
| 5,476,679 | A | 12/1995 | Lewis et al. |
| 6,827,404 | B2 * | 12/2004 | Blair ................. B60N 2/06 297/344.11 |
| 7,819,479 | B2 * | 10/2010 | Halbig ................. B60N 2/206 297/341 |
| 7,866,752 | B1 | 1/2011 | Heuser et al. |
| 8,757,719 | B2 * | 6/2014 | Hayakawa ............. B60N 2/065 297/331 |
| 8,777,316 | B2 * | 7/2014 | Shanmugam ............ B60N 2/12 297/378.14 |
| 9,637,033 | B2 * | 5/2017 | Fujita .................. B60N 2/1615 |
| 9,868,369 | B1 * | 1/2018 | Aktas .................... B60N 2/12 |
| 2004/0183353 | A1 | 9/2004 | Hahn |
| 2005/0269451 | A1 | 12/2005 | Schumacher et al. |
| 2006/0076816 | A1 | 4/2006 | Fujita et al. |
| 2006/0119158 | A1 * | 6/2006 | Haverkamp ......... B60N 2/3011 297/378.1 |
| 2007/0222263 | A1 | 9/2007 | Szczudrawa |
| 2008/0315654 | A1 | 12/2008 | Boudinot et al. |
| 2009/0261224 | A1 * | 10/2009 | Yamada ............... B60N 2/1615 248/421 |
| 2012/0319446 | A1 | 12/2012 | Runde |
| 2013/0001996 | A1 | 1/2013 | Dilsen et al. |
| 2013/0187425 | A1 | 7/2013 | Pleskot |
| 2013/0305984 | A1 | 11/2013 | Okada et al. |
| 2014/0265505 | A1 | 9/2014 | Li et al. |
| 2017/0021743 | A1 * | 1/2017 | Hiemstra ................ B60N 2/235 |

FOREIGN PATENT DOCUMENTS

| | | |
|---|---|---|
| CN | 2506959 Y | 8/2002 |
| CN | 201634792 U | 11/2010 |
| CN | 201634795 U | 11/2010 |
| CN | 102785599 A | 11/2012 |
| CN | 102995104 A | 3/2013 |
| CN | 103118898 A | 5/2013 |
| CN | 103249876 A | 8/2013 |
| CN | 103253162 A | 8/2013 |
| DE | 19647649 A1 | 5/1998 |
| DE | 19810471 C1 | 8/1999 |
| DE | 19947002 A1 | 4/2001 |
| DE | 10232017 C1 | 9/2003 |
| DE | 10311735 A1 | 10/2004 |
| DE | 102004002169 A1 | 9/2005 |
| DE | 102005043254 A1 | 3/2007 |
| DE | 102007027655 A1 | 12/2008 |
| DE | 102008024664 A1 | 11/2009 |
| DE | 102011013563 A1 | 9/2012 |
| DE | 202011110296 U1 | 7/2013 |
| DE | 102014200626 A1 | 7/2015 |
| EP | 0263003 B1 | 12/1990 |
| EP | 0968874 A1 | 1/2000 |
| EP | 1747936 A2 | 1/2007 |
| EP | 1935708 B1 | 2/2010 |
| ES | 261811 A1 | 1/1961 |
| FR | 2889123 A1 | 2/2007 |
| JP | S6428294 A | 1/1989 |
| JP | H0266680 U | 5/1990 |
| KR | 20120072604 A | 7/2012 |
| WO | WO 01/23207 A1 | 4/2001 |
| WO | WO 2005/120884 A2 | 12/2005 |
| WO | WO 2008/067958 A1 | 6/2008 |
| WO | WO 2011/086165 A1 | 7/2011 |
| WO | WO2012/028126 A1 | 3/2012 |
| WO | WO 2012/038080 A1 | 3/2012 |

OTHER PUBLICATIONS

Chinese First Office action dated Sep. 19, 2018 issued in corresponding CN Application No. 201580069632.6, 6 pages.
Chinese Office action dated May 2, 2017 cited in corresponding CN Application No. 201480041859.5, 8 pages.
Japanese Office action dated May 12, 2017 cited in corresponding JP Application No. 2016-536018, 2 pages.

* cited by examiner

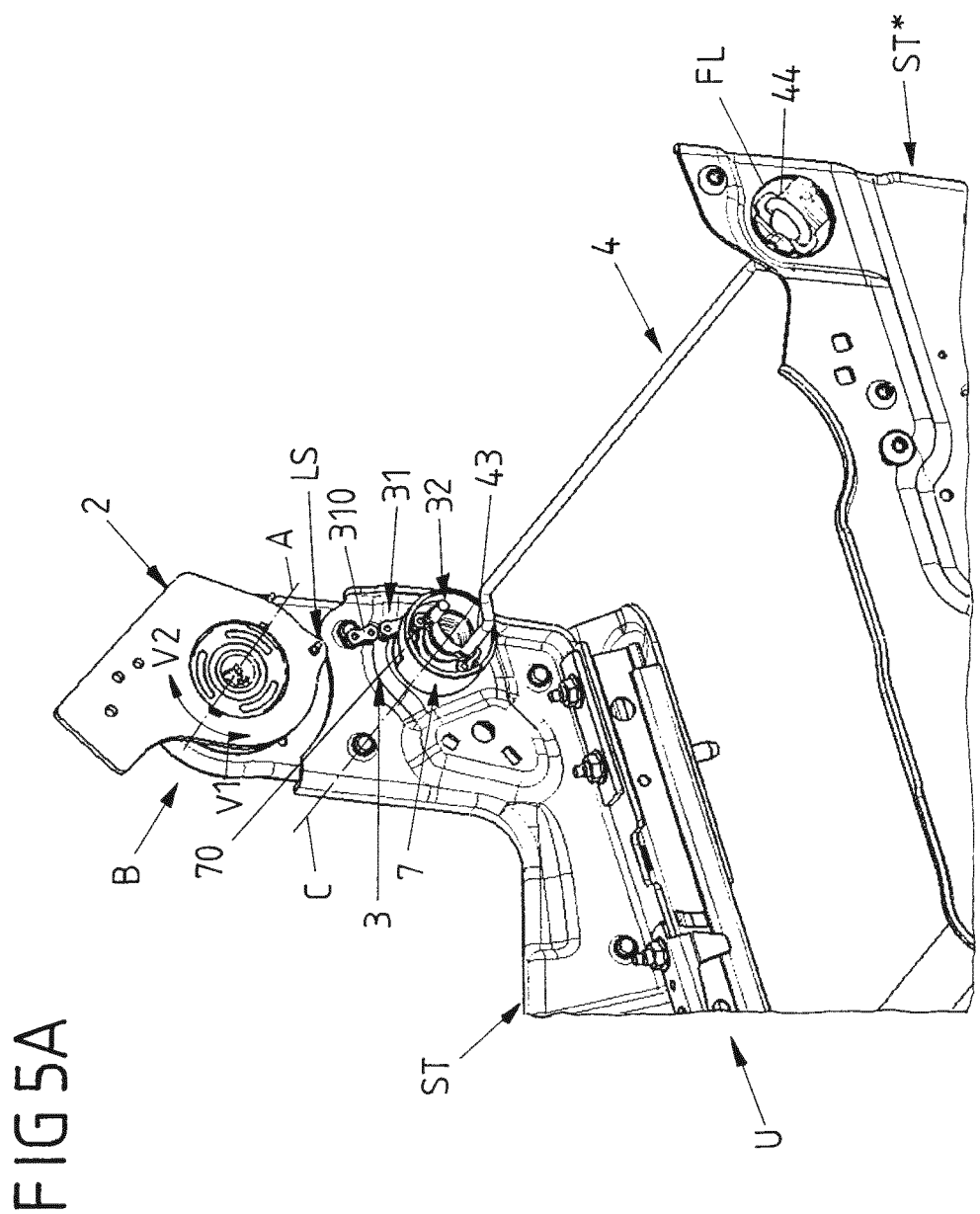

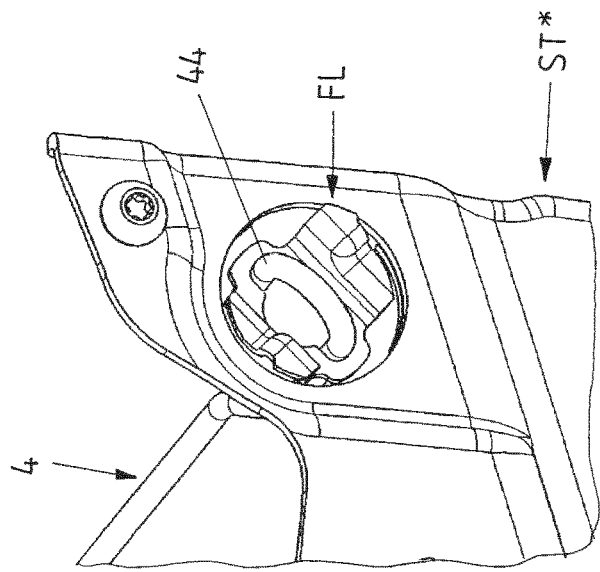
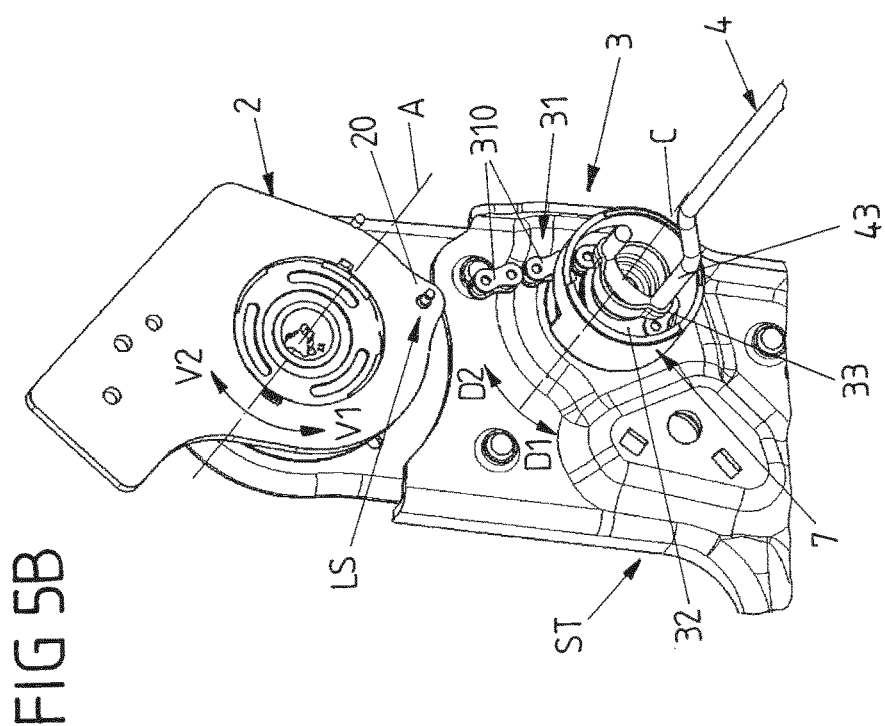

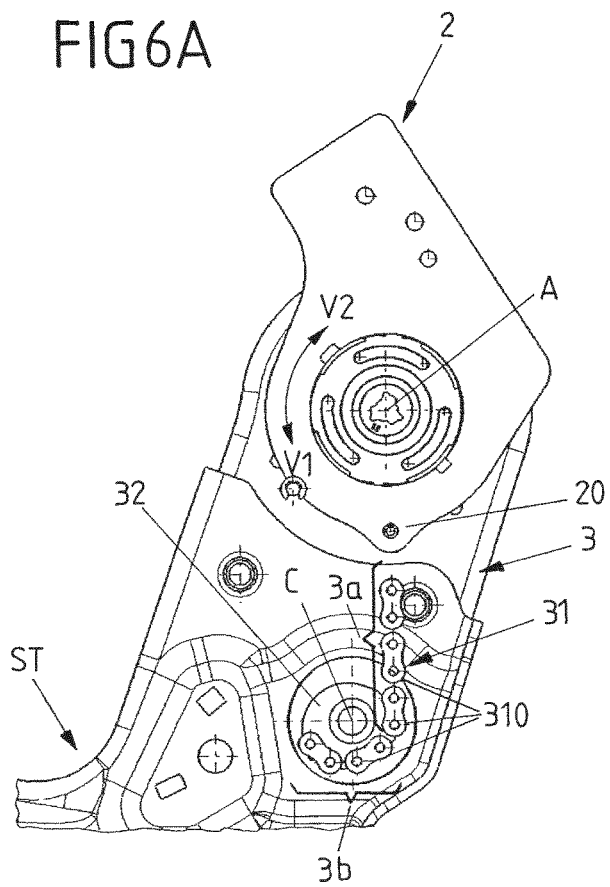
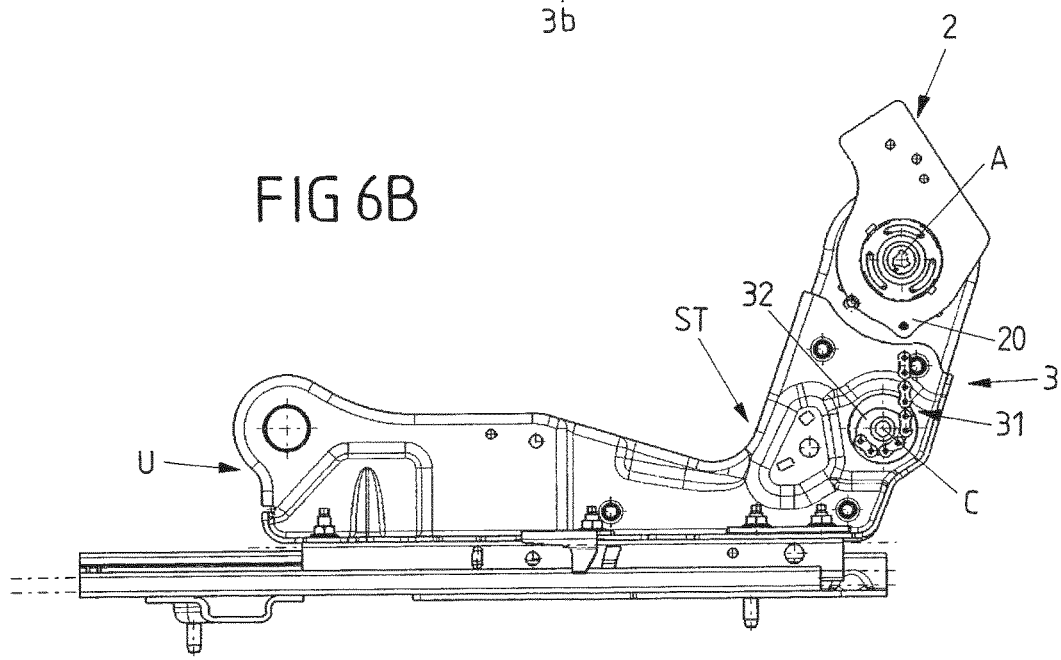

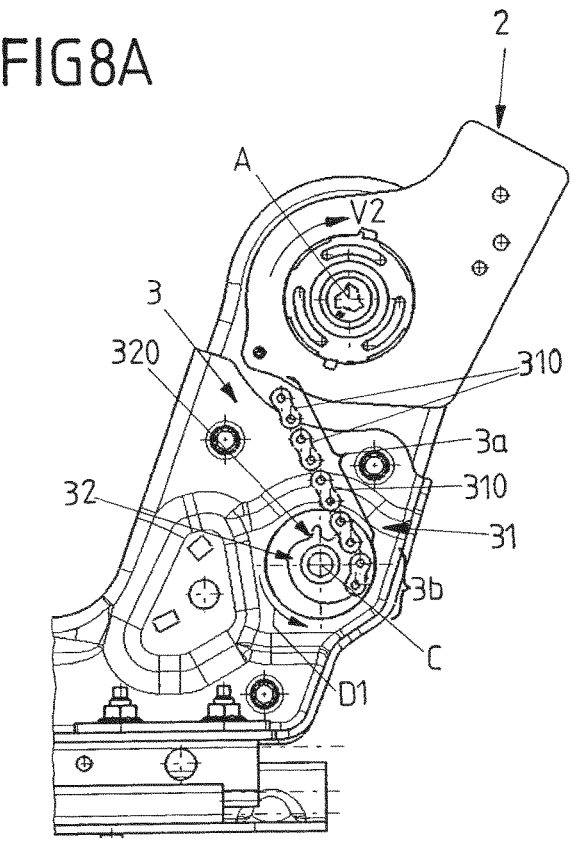
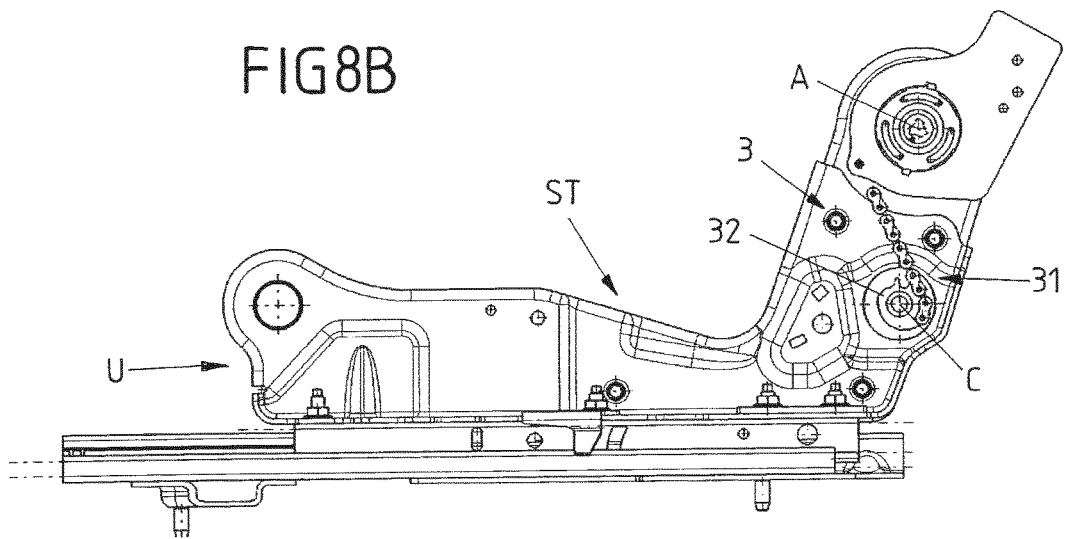

VEHICLE SEAT ASSEMBLY HAVING A RESET DEVICE

CROSS-REFERENCE TO A RELATED APPLICATION

This application is a National Phase Patent Application of International Patent Application Number PCT/EP2015/079819, filed on Dec. 15, 2015, which claims priority of German Patent Application Number 10 2014 226 642.4, filed on Dec. 19, 2014. The contents of both of which are incorporated herein by reference.

BACKGROUND

This invention relates to a vehicle seat assembly with a resetting device.

It is known to provide resetting devices in vehicle seat assemblies, in order to facilitate resetting of a first seat component which has been adjusted relative to a second seat component. On a vehicle seat a backrest for example is pivotable relative to a lower seat part and in particular foldable forwards into a so-called cargo position folded forwards. Folding back of the backrest here is supported by a usually mechanical resetting device with at least one spring element. In this way, a user must apply less force, in order to fold the backrest back. The corresponding spring element is tensioned when the backrest is pivoted, so that the energy stored thereby as resetting force supports folding back of the backrest when the spring element is relaxed again. Backrests of motor vehicles from the middle upper class usually also have a mechanical resetting device to support the adjustment of the backrest out of the cargo position, in order to improve the comfort, provide for a single-handed operation and/or facilitate putting up of the backrest.

Comparable resetting devices furthermore are also known to support setting back during height adjustments or longitudinal adjustments of vehicle seats. For example, in so-called easy-entry mechanisms in which an entry is facilitated for a rear passenger by forward folding of the backrest and simultaneous longitudinal displacement of the seat substructure, folding back of the backrest relative to the seat substructure likewise will be supported by a resetting device with a spring element, just like pushing back of the seat substructure relative to a floor assembly of the vehicle seat.

Furthermore, in particular in vehicle seats with detent fittings a spring support is necessary for the forward adjustment of the backrest, as otherwise the backrest might stop or even fall backwards when the detent fitting is released.

From DE 198 10 471 C1 it is known for example to provide a resetting means with a spring element in a motor vehicle seat with an electrically inclination-adjustable backrest, which spring element acts directly both on a seat substructure and on a backrest of the vehicle seat. Depending on the inclination of the backrest, a line of action of the spring element will extend above or below a horizontal axis. In DE 198 10 471 C1 the spring element preferably is formed as extendable coil spring and each articulated directly to the seat substructure and the backrest. It is not disclosed how the resetting device equipped with the spring element can be designed in detail. In particular, it is not disclosed how the articulation of the spring element to the backrest can be realized.

From US 2005/0269451 A1 there is furthermore known a vehicle seat for an aircraft, in which a resetting device with gas pressure springs is provided as resetting means, in order to support resetting of a backrest folded backwards and resetting of a seat cushion of the seat substructure inclined upwards. The gas pressure springs here are coupled with at least one force transmission element in the form of a rocker arm, in order to for example convert a swivel movement of the backrest into a translatory adjusting movement of a piston of a gas pressure spring and thereby provide a resetting force, when the backrest is pivoted with respect to a neutral position in which the backrest is put up. A longitudinal axis of the respective gas pressure spring and hence an adjustment axis of the longitudinally shiftable piston always extends vertically to the pivot axis of the backrest or the seat substructure. The arrangement and accommodation of the corresponding resetting device hence has little variability and also is comparatively expensive and bulky due to the necessary provision of a linkage with at least one rocker arm as force transmission element.

DE 10 2007 027 655 A1 discloses a vehicle seat in which a resetting device with a spring element is provided, in order to pretension a pivotable backrest relative to a seat substructure on the one hand into a comfort position referred to as first position of use, when the backrest is folded forwards in direction of the seat substructure into a cargo position referred to as second position of use, and on the other hand pretension the same in direction of the cargo position, when the backrest is in a comfort position. For this purpose, the resetting device includes a spring element which is fixed at the seat substructure and which is engaged by a flexible traction means in the form of a traction cable. One end of the traction cable engages the spring element, while the other end of the traction cable is connected with the pivotable backrest. To selectively deflect the traction cable in direction of the backrest, a deflection pulley firmly mounted on the seat substructure is provided. On this deflection pulley the traction cable is deflected by less than 90°, in order to exert a torque resetting the backrest in direction of the other, second or first position of use via the spring element acting directly on the traction cable in each first or second position of use of the backrest.

The resetting device known from DE 10 2007 027 655 A1 is of comparatively simple construction. In practice, however, a sufficiently safely adjustable and compact resetting device hardly can be realized by the same, as the traction cable must act directly on the spring element in the form of a coil spring subjected to a tensile stress. This also involves the fact that the traction cable possibly must be installed at the vehicle seat with great expenditure.

From WO 2011/086 165 A1 A there is furthermore known a vehicle seat in which a spring element pretensioned in a position of use of the backrest is provided, in order to fold the backrest forwards with power assistance on release of a backrest lock. The spring element is rotatably attached to a backrest rear wall of the backrest. A stationary stop, relative to which the backrest can be pivoted, cooperates with the spring element, so that in the position of use of the backrest, in which a seat user can sit down on the vehicle seat and his back is supported by the backrest, the spring element is pretensioned and exerts a resetting force on the backrest into a cargo position folded forwards.

The spring element of WO 2011/086165 A1, which is designed as torsion bar spring or torsion spring, allows a space-saving accommodation of the spring element at the vehicle seat. However, the solution described here merely is suitable for pretensioning the backrest into a cargo position, but not for supporting a resetting movement of the backrest from the cargo position into a position of use. In addition, this known solution is not suited to support the inclination adjustment of the backrest relative to the seat substructure. The arrangement of the spring element described in WO 2011/086165 A1 also tends to introduce combined bending and torsional forces into the spring element, which likewise have a negative effect on the useful life.

SUMMARY

It therefore is the object of the invention to improve a vehicle seat assembly with two seat components adjustable relative to each other and a resetting device in this respect and in particular to reduce or entirely avoid the aforementioned disadvantages.

This object is solved with a vehicle seat assembly with features as described herein.

According to a first aspect of the invention there is proposed a vehicle seat assembly with a first and a second seat component, in which the second seat component is adjustable, preferably pivotable relative to the first seat component. There is provided a resetting device by means of which a resetting force is exerted on the second seat component in direction of a neutral position, when the second seat component is adjusted with respect to the neutral position. The resetting device comprises at least one spring element in which a portion is rotated about an axis of rotation when the second seat component is adjusted with respect to its neutral position and the spring element thereby is tensioned, so that via the tensioned spring element at least a part of the resetting force is provided for transferring the second seat component into the neutral position. In addition a force transmission element of the resetting device is provided, which during an adjusting movement of the second seat component out of its neutral position transmits an adjusting force, in order to rotate and thereby tension the portion of the spring element about the axis of rotation. The force transmission element hence is equipped to tension the spring element on adjustment of the second seat component. According to the invention, the force transmission element and the spring element furthermore are formed and coupled with each other such that the spring element is dynamically loaded when the second seat component is adjusted beyond the neutral position.

The adjusting force exerted on the spring element thus varies in a vehicle seat assembly according to the invention on adjustment of the second seat component beyond the neutral position, but always is positive away from the neutral position. The adjusting force acting on the rotatable portion of the spring element for tensioning the spring element thus always is directed in the same direction of rotation. Due to the exclusively dynamic load of the spring element, its useful life is increased considerably as compared to an alternating load.

According to the invention, the spring element can be tensioned via a portion which is rotatable relative to a stationary portion, in order to provide a resetting torque and provide for a power-assisted adjustment of the second seat component into its neutral position relative to the first seat component. The spring element hence is tensioned when the second seat component is adjusted with respect to its neutral position, so that via the tensioned spring element a resetting torque is provided for transferring the second seat component into its neutral position. The spring element, which in the tensioned condition with one portion is rotated against a resetting force, hence if necessary exerts a resetting torque which via the force transmission element is converted into a resetting force acting on the second seat component. The spring element, as mechanical energy accumulator, for example can be formed as torsion bar spring or torsion spring twistable for tensioning or as spiral spring to be wound more tightly for tensioning.

According to the invention, the force transmission element furthermore is coupled with an element of the resetting device rotatably mounted about the axis of rotation and connected with the spring element, via which on the one hand an adjusting force can be transmitted from the force transmission element to the spring element and via which on the other hand a resetting force can be transmitted from the spring element to the force transmission element. The additional element thus is provided between the force transmission element and the spring element, in order to transmit forces between the force transmission element and the spring element. Preferably, the force transmission element, the additional element and the spring element are separate, but interconnected components of the resetting device.

According to the invention, the force transmission element comprises a flexible traction means, such as a cable or a chain. The spring element for example can be formed as torsion bar spring or profile bar spring, with e.g. round cross-section or square or hexagonal profile, or as spiral spring. The additional element for example is formed with a coupling part which includes a spring receptacle for positively holding the spring element.

According to the invention, the additional element comprises at least one winding element on which at least in the neutral position of the second seat component a portion of the flexible traction means of the force transmission element is wound up. In this way, the resetting device hence is constructed such that on adjustment of the second seat component relative to the first seat component out of the neutral position, the flexible traction means is unwound from the rotatably mounted winding element and the winding element thereby is put into rotation. The winding element is non-rotatably connected with a portion of the spring element, so that this portion is rotated about the axis of rotation due to the rotation of the winding element, while a portion of the spring element spaced therefrom is stationary and non-rotatingly fixed. In this way, the spring element is tensioned due to the rotation of the portion entrained by the winding element, as soon as the second seat component leaves the neutral position. Due to the tensioned spring element the winding element seeks to again wind up the traction means. Since the force transmission element engages the one seat component and the winding element is rotatably mounted on the other seat component, the adjustable second seat component always seeks to again take the neutral position.

Preferably, the second seat component is adjustable out of its neutral position in two opposite adjustment directions and the at least one force transmission element and the spring element are formed and coupled with each other such that by means of the resetting device a resetting force is exerted on the second seat component in direction of the neutral position, both when the second seat component is adjusted from the neutral position in the one adjustment direction and when the second seat component is adjusted from the neutral position in the other adjustment direction. For example in the case of a backrest as second seat component, the resetting device thereby exerts a resetting force into a neutral position, when the backrest is folded forwards onto a seat cushion and when the backrest is inclined further backwards beyond the neutral position.

The force transmission element and the spring element here can be formed and coupled with each other such that the rotatable portion of the spring element always is rotated about the axis of rotation in the same direction of rotation—with respect to a stationary, e.g. firmly clamped or otherwise fixed portion of the spring element—and the spring element thereby is tensioned, independent of whether the second seat component is adjusted from the neutral position into the one or other adjustment direction. The spring element which thereby is exclusively dynamically loaded via the force transmission element thus always is tensioned along one and the same direction of rotation about the axis of rotation to apply the resetting force.

The second seat component for example is pivotable about a pivot axis relative to the first seat component. In particular the second seat component can be the backrest of the vehicle seat, and the seat component can be the seat substructure with the seat base carrying the seat cushion. In possible design variants the axis of rotation of the spring element and the pivot axis of the seat component do not coincide. With the solution according to the invention it is not absolutely necessary that the spring element to be tensioned must be arranged directly in the region of a fitting, in particular a rotary or detent fitting, of the vehicle seat. It can rather be provided that the axis of rotation of the spring element extends parallel or transversely to the pivot axis of the second seat component, so that the arrangement of the resetting device is not limited by the installation space available in the region of the pivot axis.

In one exemplary embodiment the winding element includes a winding region extending along the circumference of the winding element, against which a portion of the flexible traction means rests, which is wound up in the neutral position of the seat component, wherein this winding region is formed such that the portion wound up on the same does not extend along a circular line about the axis of rotation. Such design variant in particular includes the fact that a winding region, on which a cable or a chain can be wound up, defines a width of the winding element that varies in radial direction. For example, the winding element can be broadened in the winding region excentrically or like a cam. Broadening of the winding element in the winding region for example results from a variation of the radial dimensions of the winding element at the winding region and then is accompanied by a local increase in diameter. Over the winding region changing in its width and hence in its diameter along the circumference, the adjusting force transmitted to the spring element can be varied already via the contour of the winding element along an adjustment path of the second seat component when the flexible traction means is wound up and unwound. The course of a torque, which on adjustment of the second seat component is applied to the winding element for tensioning the spring element via the force transmission element, also can be controlled selectively via the outer contour of the winding element.

In a development based thereon, the winding element at least in a winding region for example has a diameter which decreases along a direction of rotation in which the winding element is rotated about the axis of rotation, when the second seat component is adjusted with respect to the neutral position. The decrease in diameter can be effected incrementally or continuously. By means of the diameter varying in this way, unwinding of the flexible traction means from the winding element results in the fact that on adjustment of the second seat component with respect to its neutral position an effective lever length of the flexible traction means is increased for the applied resetting force on the second seat component. In the neutral position and hence in the condition usually wound up maximally, the course of the wound portion substantially follows a portion of a narrowing spiral around the axis of rotation of the winding element. An end of the flexible traction means fixed at the winding element thus is present at the broadest point, i.e. in the region of the largest diameter, of the winding region. With this shape, the point at which a non-wound portion of the flexible traction means transitions into a wound portion then "travels" radially to the outside on the winding element, when the seat component is adjusted out of the neutral position.

In a flexible traction means of the force transmission element formed as chain, the winding element can include at least two, i.e. several form-fit elements for a positive connection with a chain portion wound up on the winding element. By providing several form-fit elements spaced from each other along the circumference of the winding element, the winding element possibly is in engagement with the chain via more than one form-fit element in dependence on the degree of winding of the chain.

At least one form-fit element can be formed by a tooth of a toothing provided on a circumference of the winding element. The teeth of such toothing for example engage into chain members of a chain portion wound up on the winding element, so that a positive connection of the respective chain member with the winding element thereby is provided. It can be provided in principle that the winding element is formed with a circumferential toothing. In a resetting device for exerting a resetting force on a pivotable backrest of a vehicle seat, however, it is provided in one design variant to provide a toothing only over a part of the circumference of a winding element. A backrest usually is pivotable relative to a seat substructure only in a closely limited angular range between a position pivoted maximally backwards and a position pivoted maximally forwards; for example in a range of below 130°, in particular in a range of below 120°, and for example in a range of about 110°. In one exemplary embodiment it therefore is sufficient to merely form a part of the circumference of the winding element, for example not more than half of the circumference, with a toothing which then forms a winding region for the chain to be wound up. Analogously, in another flexible traction means such as a cable, only a part of the circumference of the winding element extending around the axis of rotation likewise can be provided for winding up and unwinding a portion of the traction means.

The toothing can include teeth with different distances to the axis of rotation of the winding element. In this way, a toothing for example is provided by the winding element, in which along the circumference and hence along a direction of rotation of the winding element around the axis of rotation teeth are present, in which a line extending through the centers of the tooth flanks does not have a constant distance to the axis of rotation and thus does not follow the course of a circular line around the axis of rotation. The radial position and/or the geometry of the individual teeth thus can be varied selectively, in order to influence the course of the adjusting force transmitted to the spring element on adjustment of the second seat component. For example, the teeth can have different tooth heights. Alternatively or in addition, teeth with identical tooth heights can be provided, which however are formed on portions of a winding element with different radial thickness. Correspondingly, the point at which a non-wound portion of the chain transitions into a wound portion here travels radially to the inside or to the outside on the winding element, when the seat component is adjusted and the winding element thereby is rotated.

Alternatively or in addition, teeth of the winding element can have at least two different tooth shapes. This in particular includes the fact that an (end) tooth to which one end of a chain as flexible traction means of the force transmission element is positively fixed has a different tooth shape than the remaining teeth for the chain portion wound up in the neutral position. In this connection it can be provided for example that an (end) tooth provided for the fixation of a chain end at the winding element has an angled tooth end, so that the same at least slightly engages behind a portion of a chain link at the end of the chain, in order to secure the chain at the winding element.

In one exemplary embodiment the preferably longitudinally extending spring element is at least partly accommodated within a hollow portion of a supporting structural component of the vehicle seat, such as a transverse tube, which in the properly mounted condition extends between two seat side parts of a seat substructure of the vehicle seat. The transverse tube usually connects the two seat side parts and forms a (front or rear) part of a seat base carrying the seat cushion. For example, a seat suspension element for resiliently mounting a seat cushion also can be attached in particular to a rear transverse tube.

Due to the arrangement at least of the spring element within a hollow transverse tube, the spring element and hence also the resetting device can be accommodated at the vehicle seat in a particularly space-saving way. On a shell surface of the transverse tube merely one cutout is provided, in order to connect a force transmission element, which is articulated to a component pivoted along with the backrest, in the interior of the transverse tube with the spring element or an additional element of the resetting device connected with the spring element.

In an alternative design variant, the spring element is arranged on a backrest of the vehicle seat. Thus, the spring element itself is moved around the pivot axis of the backrest together with the same, but at the same time tensioned during an adjustment away from the neutral position around the axis of rotation. The force transmission element therefor engages a stationary portion of the seat substructure and is coupled with the spring element such that the same is tensioned at the backrest itself, when the backrest is pivoted out of the neutral position—forwards or backwards.

In one exemplary embodiment the spring element is arranged on an inside of the backrest. Preferably, an e.g. tubular housing is formed on the inside of the backrest, within which at least the spring element is accommodated. For example, the housing is located in a lower region of the backrest in particular in the vicinity of the connection of the backrest to a fitting, in particular to a rotary or detent fitting.

In one exemplary embodiment the force transmission element, which is equipped to transmit an adjusting force by an adjusting movement of the second seat component out of a neutral position, in order to rotate and thereby tension the spring element around the axis of rotation, is articulated to a bearing point of one of the two seat components. Due to the articulation of the force transmission element transmitting the adjusting force and separate from the spring element, not only the kinematic connection between force transmission element and spring element is considerably more variable. Rather, this also allows a coupling between force transmission element and the spring element to be tensioned for applying the resetting force, in which the arrangement of the spring element is easily adaptable to specified installation space conditions and in particular in the case of a backrest as second adjustable part and a seat substructure as first adjustable part need not be effected in direct vicinity of a fitting of the vehicle seat.

To achieve that during an adjustment of the second seat component in at least one adjustment direction the force transmission element transmits an adjusting force, it cooperates with both seat components. The spring element of the resetting device, which is rotated about its axis of rotation to apply the resetting force and thus is twisted or wound, for example, is mounted on one of the two seat components. The articulation of the force transmission element preferably is effected at a bearing point of the other seat component, i.e. at that seat component on which the spring element is not mounted. The force transmission element for example can be articulated to a component defining the bearing point, which is adjusted along with an adjusting movement of the second seat component. The spring element then preferably is mounted on the first seat component. Alternatively, the force transmission element can be articulated to a component defining the bearing point, which is immovably fixed at the first seat component. In this variant, the spring element of the resetting device with its rotatable portion preferably is arranged on the adjustable, second seat component.

In principle, the force transmission element can be articulated in the region of a fitting, via which a backrest of the vehicle seat, as second seat component, is pivotally mounted on a seat substructure of the vehicle seat, as first seat component.

In principle, the solution according to the invention is suitable for different seat components of a vehicle seat adjustable relative to each other, in particular for a seat height adjustment, a seat depth adjustment or the adjustment of a backrest of a vehicle seat. In a design variant for the adjustment of a pivotable backrest, the neutral position preferably lies between possible comfort positions of the backrest, in which a proper support of the back of a seat user is ensured, and a cargo position of the backrest, in which the backrest is folded forwards in direction of a seat cushion. The backrest thus can be adjusted in its inclination and take different comfort positions, which include the neutral position, and possibly can additionally be folded forwards into a cargo position in direction of a seat cushion. In such a design variant a resetting force can be exerted on the backrest in direction of the neutral position by means of the resetting device according to the invention, both when the backrest is pivoted in the one swivel direction and when the backrest is pivoted in the other swivel direction with respect to its neutral position. In this way, swivelling the backrest back in direction of its neutral position—backwards out of a cargo position or forwards out of a comfort position—always is supported by the resetting device.

Via the spring element it preferably is ensured that the resetting force varies in dependence on an adjustment with respect to the neutral position. The resetting force for example is the greater, the more a backrest is pivoted forwards or backwards with respect to the neutral position. Thus, the magnitude of the resetting force in this case varies in dependence on the swivel angle with respect to the neutral position.

Moreover, a vehicle seat of course cannot have only one resetting device, but also two resetting devices with one spring element each. Each resetting device engages one of two long sides of the backrest. For example, two resetting devices with one spring element each can be provided on a right and a left backrest long side of a vehicle seat, in order to synchronously support the adjustment of the backrest in direction of the neutral position on both backrest long sides.

BRIEF DESCRIPTION OF THE DRAWINGS

Further advantages and features of the invention will become apparent from the following description of exemplary embodiments with reference to the Figures.

FIG. 5A in a perspective view and partially shows a vehicle seat of a further design variant of a vehicle seat assembly according to the invention.

FIGS. 5B-5C on an enlarged scale show details of a resetting device of the seat assembly of FIG. 5A in the region of the opposite seat sides.

FIGS. 6A-6B each in a side view looking at an inside, but in different sections, show the vehicle seat of FIGS. 5A to 5C with the backrest in neutral position.

FIGS. 8A-8B in views corresponding with FIGS. 6A to 6B show the vehicle seat with the backrest swivelled forwards.

DETAILED DESCRIPTION

Figure 1:
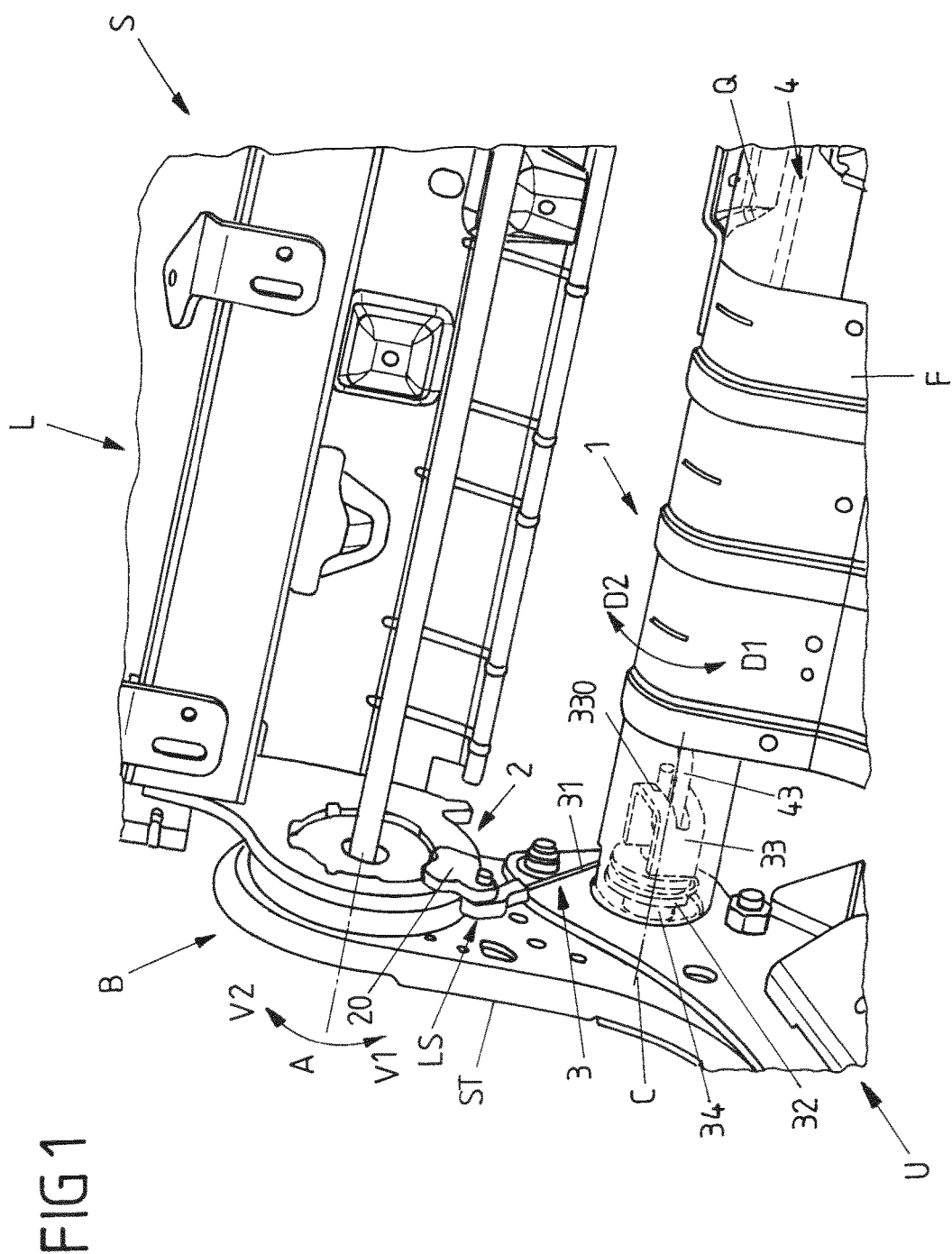
FIG. 1 partially shows a vehicle seat with a seat substructure, a backrest pivotally mounted relative to the seat substructure, and a resetting device with a torsion bar spring which supports swivelling back of the backrest in direction of a neutral position, when the backrest is pivoted forwards or backwards with respect to the neutral position.

FIG. 1 partially shows a vehicle seat S, in which a backrest L for supporting the back of a seat user is pivotally mounted on a seat substructure U about a pivot axis A. For pivotally mounting the backrest L on the seat substructure U, rotary or detent fittings B are provided on both backrest long sides. With a view to a backrest long side, FIG. 1 shows that a fitting part of the fitting B is provided at a seat side part ST of the seat substructure U. The seat side part ST usually is fixed on a floor of the vehicle or on a seat rail for longitudinal adjustment of the vehicle seat and forms a part of a seat base carrying a seat cushion of the vehicle seat S. The backrest L here is pivotable about the pivot axis A along two swivel directions V1 and V2. Along the swivel direction V1 the backrest L can be pivoted forwards in direction of a non-illustrated seat cushion and preferably can also be folded forwards onto the seat cushion, so that the backrest L takes a cargo position. Along the opposite adjustment direction V2 the backrest L can be pivoted backwards.

According to the invention, the vehicle seat S includes a resetting device 1 which exerts a resetting force on the backrest L, when the same is adjusted about the pivot axis A in one of the adjustment directions V1 and V2 relative to the seat substructure U with respect to a neutral position specified via the resetting device 1. Via the resetting device 1, a resetting force supporting the swivel movement of the backrest L in direction of the neutral position is applied, both when the backrest L is in the cargo position folded forwards and when the backrest L is in a comfort position put up (more strongly) beyond the neutral position or pivoted backwards. The neutral position, in which the backrest L experiences a resetting force via the resetting device 1, here is chosen such that the backrest L here is in a position relative to the seat substructure U which lies between the cargo position, in which the backrest L is maximally folded forwards in direction of the seat cushion of the seat substructure U, and a comfort position or several possible comfort positions, in which a seat user can comfortably sit down on the vehicle seat S and possibly also can adjust the inclination of the backrest L relative to the seat substructure U.

The resetting device 1 therefor includes a torsion bar spring 4, which is straight in the present case and which is twisted in the case of an adjustment of the backrest L with respect to the neutral position and hence mechanically stores energy, in order to drive the backrest L for an adjustment into the neutral position. The torsion bar spring 4 therefor is coupled with a force transmission element 3 which transmits an adjusting force to the torsion bar spring 4 when the backrest L is pivoted relative to the seat substructure U. In this way, the torsion bar spring 4 is twisted and hence tensioned, when the backrest L is folded forwards from its neutral position into the cargo position or into a comfort position. For tensioning, the torsion bar spring 4 hence is loaded with a torque, so that in the tensioned condition the torsion bar spring 4 exerts a resetting torque which via the force transmission element 3 is converted into a tensile force acting on the backrest L.

In the exemplary embodiment of FIG. 1, the force transmission element 3 is coupled with a flexible traction means in the form of a traction cable 31, e.g. a steel cable, and at one end with the backrest L. One end of the force transmission element 3 therefor includes a connecting piece 30 which is articulated to a bearing point LS of the backrest L. The bearing point LS is formed by an adapter part 2. This adapter part 2 is fixed at a fitting part of the backrest L, so that the adapter part 2 is adjusted about the pivot axis A together with the backrest L. The adapter part 2 welded for example to the fitting part of the backrest L or molded thereto forms an adapter nose 20 at which the connecting piece 30 is pivotally held, i.e. articulated thereto, so that the connecting piece 30 can take different swivel positions relative to the adapter part 2. When the backrest L is pivoted, the adapter part 2 thus can entrain the connecting piece 30 and thereby pulls on the traction cable 31 of the force transmission element 3, when the backrest L no longer is in the neutral position.

At its end opposite the connecting piece 30 the traction cable 31 is wound up on a winding roller 32 which in the present case is rotatably mounted about a bearing axis C on an inside of the seat side part ST. By pulling on the traction cable 31 the same thus is unwound from the winding roller 32. The winding roller 32 is non-rotatably connected with the torsion bar spring 4 via a coupling part 33, so that unwinding the traction cable 31 from the winding roller 32 can be effected only against a resetting force of the torsion bar spring 4. The winding roller 32 therefor is non-rotatably connected with the coupling part 33 or forms the coupling part 33, at which an end piece 43 of the torsion bar spring 4 is positively held. For rotatably mounting the winding roller 32 and the end piece 43 of the torsion bar spring 4 connected therewith a bearing bolt 34 is provided, which is mounted on the inside of the one side part ST.

The coupling part 33 includes a spring receptacle 330 in the form of an oblong cutout into which the loop-shaped end piece 43 of the torsion bar spring 4 engages and is held therein. The other end of the torsion bar spring 4 not shown in FIG. 1 is stationary and fixed correspondingly, so that by rotating the end piece 43 about the axis of rotation C coinciding with the bearing axis and the longitudinal axis of the torsion bar spring 4, the torsion bar spring 4 can be tensioned (more strongly). The torsion bar spring 4 is (almost) relaxed in the neutral position of the backrest L and for example only subjected to a pretension inherent to the mounted resetting device 1, e.g. in order to always keep the traction cable 32 under tension. When the backrest L hence is pivoted forwards or backwards about the pivot axis A out of the neutral position along the swivel direction V1 or V2, the adapter part 2 firmly mounted on the backrest also is pivoted. The adapter part 2 entrains the connecting piece 30 articulated thereto and thereby unwinds the traction cable 31 from the winding roller 32 by twisting the torsion bar spring 3.

The end piece 43 of the torsion bar spring 4 is rotated along one and the same direction of rotation D1 about the axis of rotation C both when pivoting the backrest L in swivel direction V1 and when pivoting the backrest L in the swivel direction V2, and the torsion bar spring 4 thereby is tensioned. The end piece 43 thus seeks to move in the opposite direction of rotation D2 and thereby again wind the traction cable 31 onto the winding roller 32. Via the traction cable 31 a resetting force hence acts on the backrest L, by which the backrest L is drawn in direction of its neutral position. Hence, when a lock e.g. in the region of the fitting B is released, when the backrest L is in a cargo position or in a comfort position, the resetting device 1 supports swivelling (back) of the backrest L into the neutral position via the tensioned torsion bar spring 4.

Via the chosen arrangement with windable force transmission element 3, its articulation to the adapter part 2 firmly mounted on the backrest and the use of the torsion bar spring 4 a particularly long-lived and efficient mechanically acting resetting device 1 is provided. Moreover, it is ensured that the torsion bar spring 4 is loaded only dynamically and not alternatingly over the entire admissible range of adjustment of the backrest L about the pivot axis A. The torsion bar spring 4 hence always is tensioned only along the direction of rotation D1 about the axis of rotation C and relaxed by rotating the end piece 43 in the opposite direction of rotation D2.

The position of the neutral position in principle can be chosen freely, so that in contrast to the variant described above the neutral position also can correspond to a comfort position of the backrest L or a position of the backrest L folded forwards partly or completely. For example, based on the entire admissible range of adjustment from the cargo position maximally folded forwards to a position of the backrest L maximally inclined backwards, the neutral position can lie exactly in the middle or in the first or last tenth or third of the range of adjustment.

In the exemplary embodiment of FIG. 1 the winding roller 32, the coupling part 33 provided thereon and the torsion bar spring 4 are accommodated completely within a hollow transverse tube Q of the seat substructure U. This transverse tube Q connects the two seat side parts ST with each other and hence forms a supporting part of the seat base. In the present case, for example, a spring mat F is held at this rear transverse tube Q—based on the orientation of the vehicle seat S within the vehicle. The spring mat F serves the resilient support of a non-illustrated seat cushion of the vehicle seat S. However, a seat pan of the vehicle seat S might of course also be attached to the transverse tube Q.

Since the resetting device 1 is protectively accommodated almost completely within the transverse tube Q, the same can be arranged on the vehicle seat S almost without requiring additional installation space. The connection of the force transmission element 3 to the adapter part 2 of the backrest L lying outside the transverse tube Q is effected via a lateral cutout on the outside of the transverse tube Q. The traction cable 31 here is guided out of the interior of the transverse tube Q to the outside.

Figure 2:
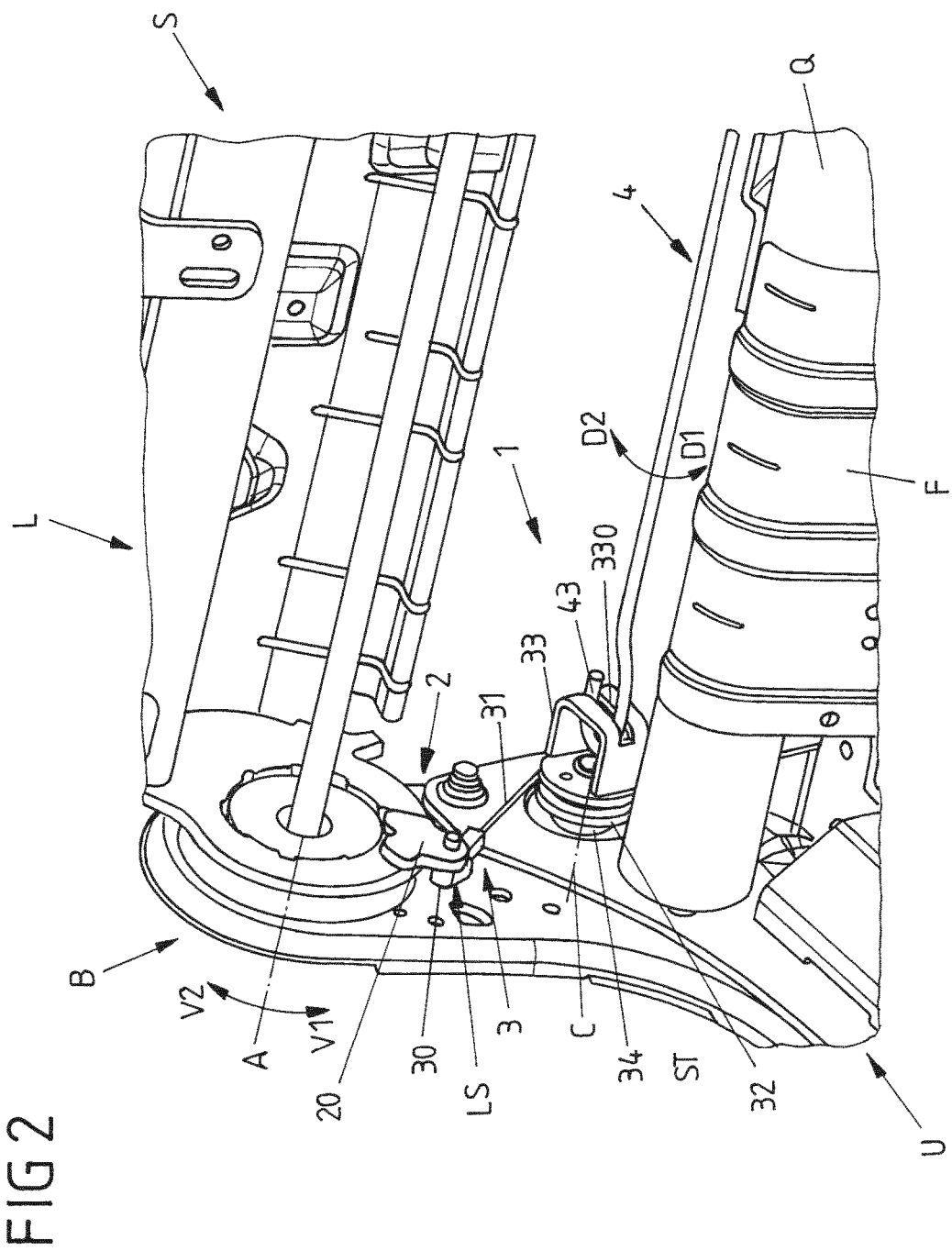
FIG. 2 in a view corresponding with FIG. 1 shows an alternative embodiment of the resetting device, in which the torsion bar spring is not arranged within a rear transverse tube of the seat substructure, but behind this transverse tube.

In the exemplary embodiment of FIG. 2 the basic structural design of the resetting device 1 has been maintained. In contrast to the exemplary embodiment of FIG. 1, merely the winding roller 32 with the coupling part 33 provided thereon and the torsion bar spring 4 held at the same here are not arranged within the transverse tube Q, but beside the transverse tube Q. In the present case, said components of the resetting device 1 are arranged behind the transverse tube Q, based on the direction of travel of the vehicle in which the vehicle seat S is arranged. The bearing/rotation axis C for the winding roller 32, which here also coincides with the longitudinal axis of the torsion bar spring 4, again extends parallel to the pivot axis A of the backrest L and in the present case also parallel to the axis of the longitudinal extension of the transverse tube Q.

Figure 3:
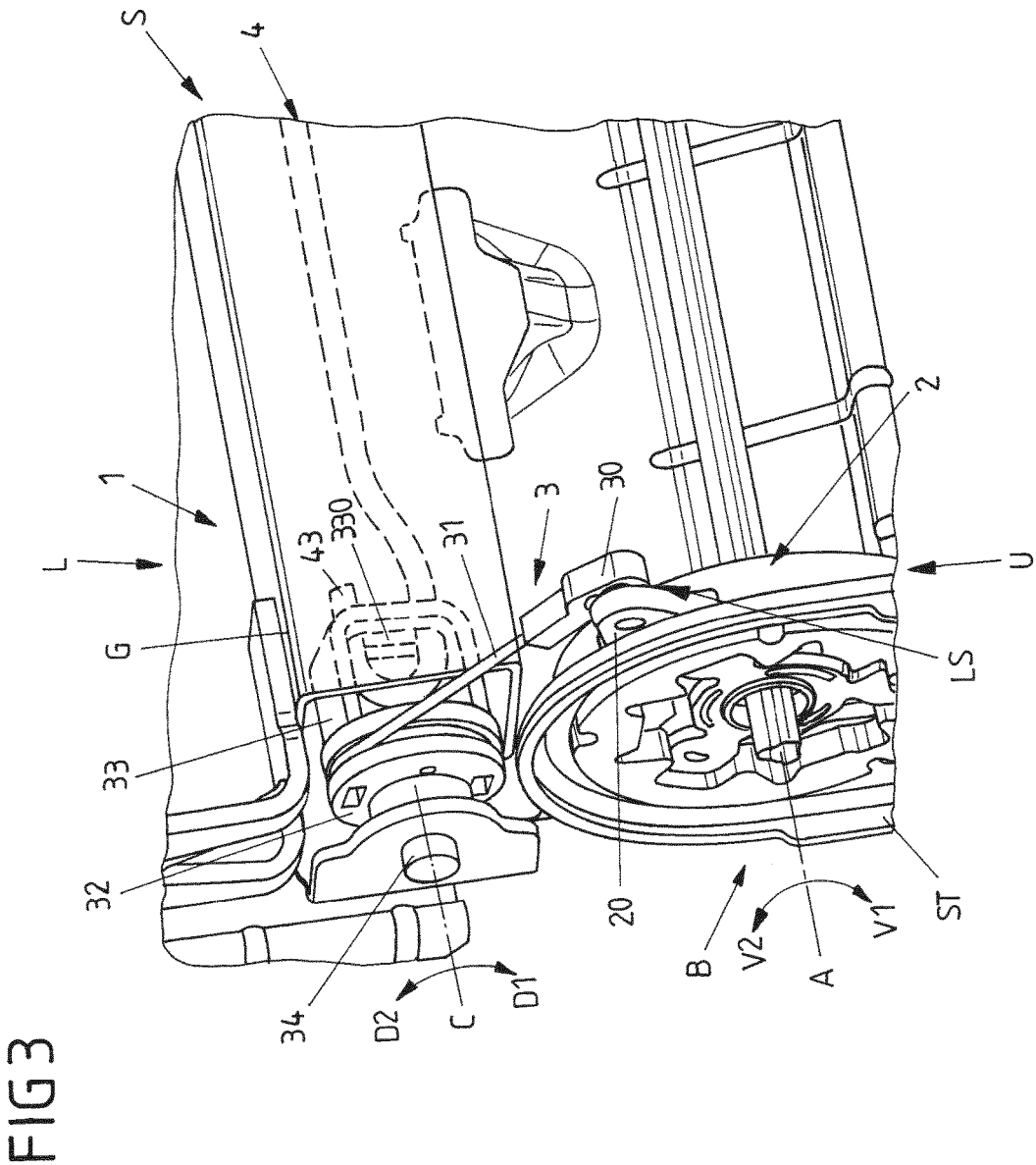
FIG. 3 shows a further design variant of a resetting device, in which the torsion bar spring is mounted on the backrest.

FIG. 3 illustrates an exemplary embodiment in which in particular the torsion bar spring 4 is not arranged on the seat substructure U, but on the backrest L. Here, the winding roller 32 with the coupling part 33 provided thereon is rotatably mounted on the backrest L and the adapter part 2, to which the free end of the Bowden cable 31 with the connecting piece 30 is attached, is fixed to a fitting part on the side of the substructure or is directly fixed to the side part ST. The bearing bolt 34 for rotatably mounting the winding roller 32 here is arranged on a tab-shaped bearing portion on the inside of the backrest L.

In transverse direction, i.e. parallel to the pivot axis A, a housing G which is tubular and/or provided as crossbeam is formed on the inside of the backrest L in a lower region. In this housing G the torsion bar spring 4 is accommodated. At a housing opening opposite the tab-shaped bearing portion, the coupling part 33 non-rotatably connected with the end piece 43 protrudes from this housing G. The winding roller 32 thus does not (completely) lie within the housing G, so that the traction cable 31 need not be guided out of the housing G of the backrest L.

Although in the exemplary embodiment of FIG. 3 the torsion bar spring 4 is not mounted on the seat substructure U, but on the backrest L, nothing is changed with the function described above. By pivoting the backrest L about the pivot axis A with respect to the set neutral position, the traction cable 31 here is also unwound from the winding roller 32. The only difference here consists in that the adapter part 2 connected with the connecting piece 30 of the force transmission element 3 is stationary and in particular the winding roller 32 rotatably mounted at a distance to the pivot axis A is pivoted about the pivot axis A together with the backrest L. When the backrest L is pivoted away from the neutral position, the winding roller 32—due to its coupling to the seat substructure U via the force transmission element 3—is rotated on the backrest L about the bearing/rotation axis C and the torsion bar spring 4 is twisted for storing mechanical energy. As a result, the torsion bar spring 4 here always is subjected to a dynamic load only, in order to exert a resetting force on the backrest L in an adjustment position of the backrest L away from the neutral position, and to pull said backrest in direction of the neutral position by means of the force transmission element 3.

Figure 4:
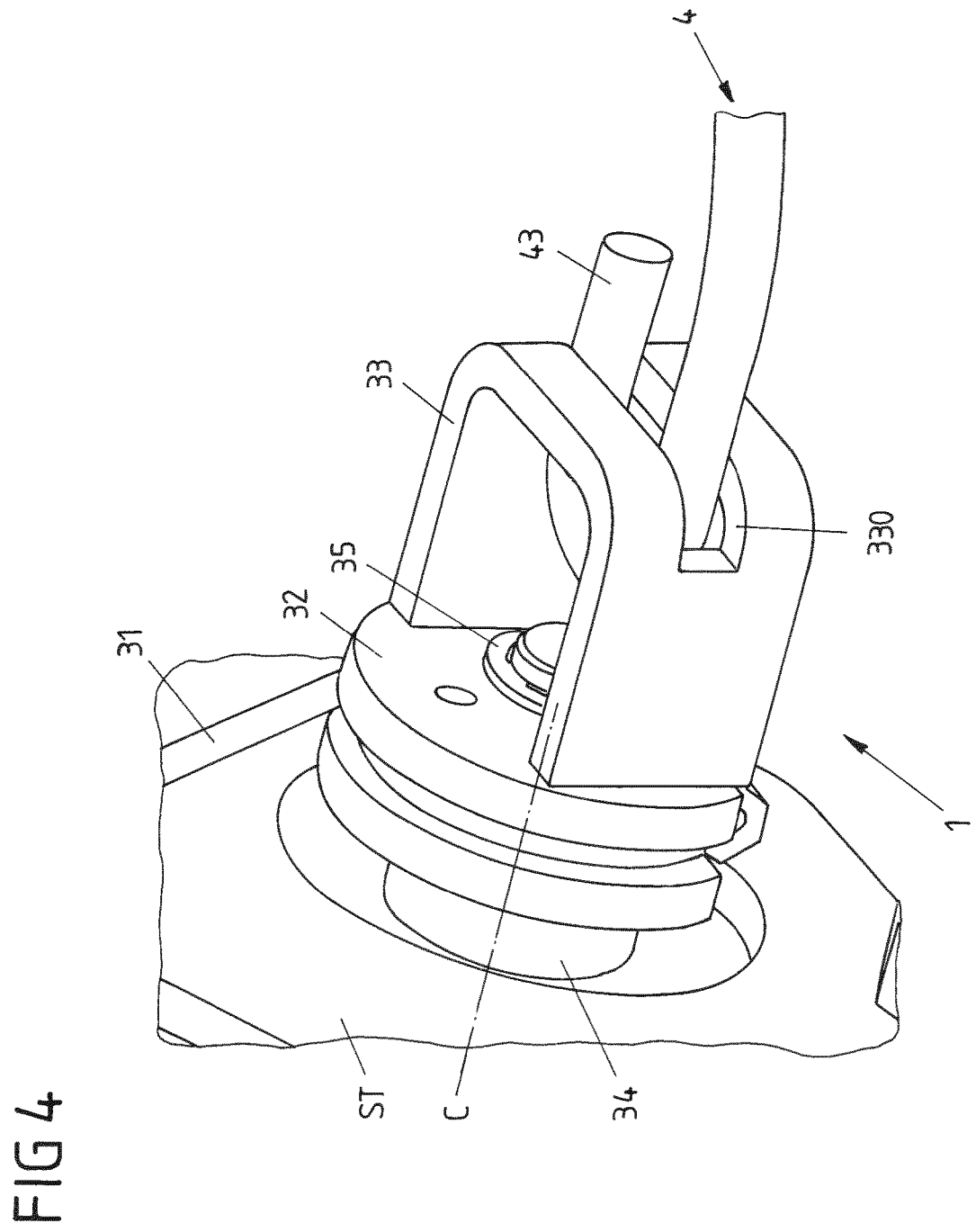
FIG. 4 on an enlarged scale shows details for mounting the torsion bar spring and for coupling the torsion bar spring with a force transmission element articulated to the backrest according to the design variants of FIGS. 1 and 2.
Figure 7A:
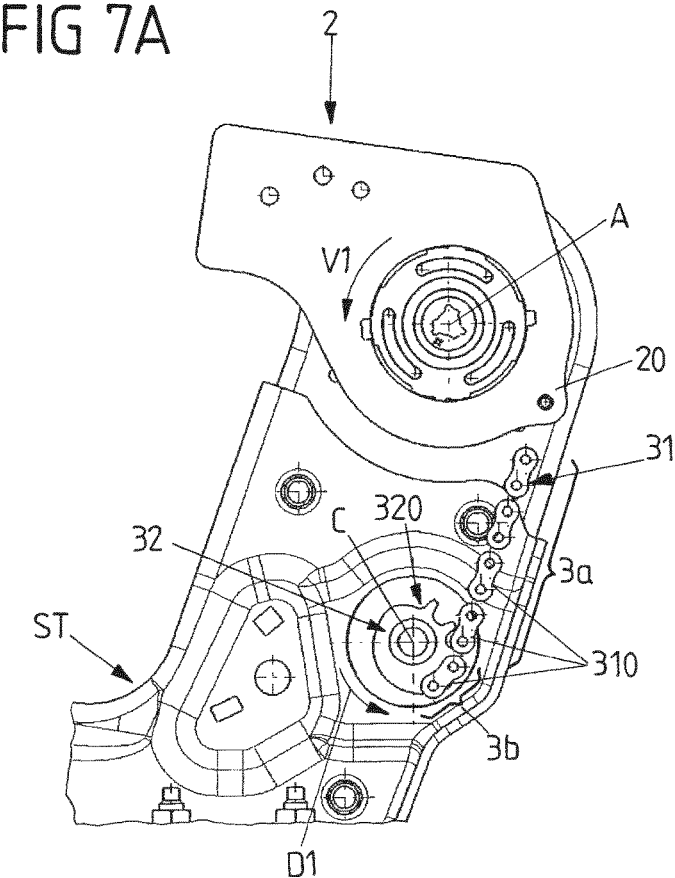
FIGS. 7A-7B in views corresponding with FIGS. 6A to 6B show the vehicle seat with the backrest swivelled backwards.
Figure 7B:
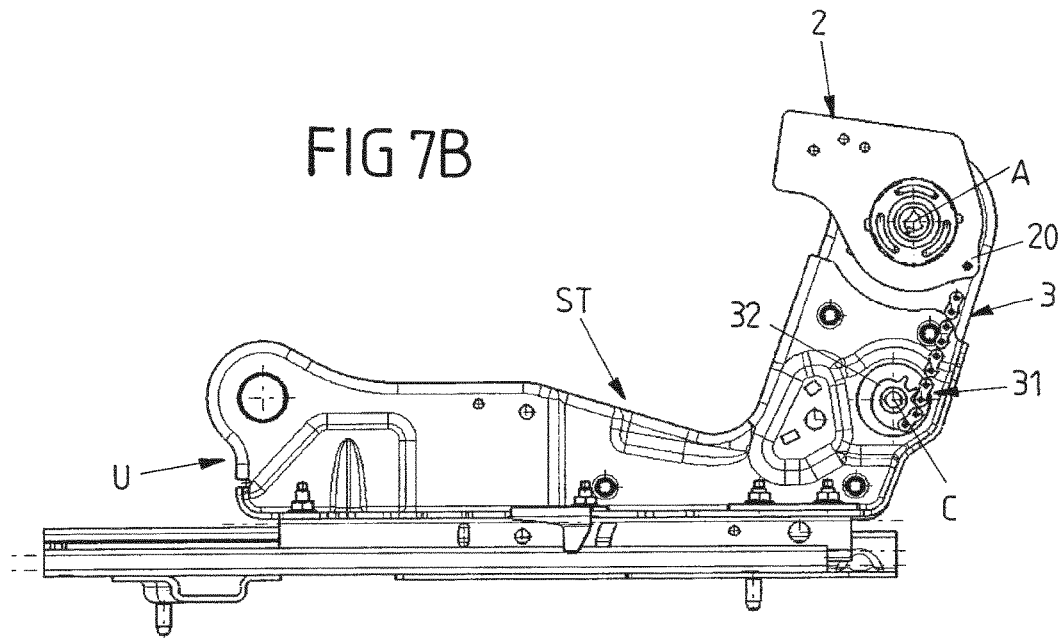

In the enlarged representation of FIG. 4, details of the winding roller 32, the coupling part 33 and the end piece 43 of the torsion bar spring 4 connected with the coupling part 33 can be seen. FIG. 4 for example shows the axial securement of the winding roller 32 on the bearing bolt 34 via a locking ring 35. The substantially U-shaped cross-section of the coupling part 33 of FIG. 4 also is clearly visible, which towards the end face of the winding roller 32 defines a receiving space. Into this receiving space the end piece of the torsion bar spring 4 extends, which is held in the spring receptacle 330. The end piece 43 of the torsion bar spring 4 bent over by about 180° is inserted into the spring receptacle 330, in order to non-rotatably connect the one rotatable end of the torsion bar spring 4 with the coupling part 33 and thereby non-rotatably connect it with the winding roller 32.

FIGS. 5A to 5C, 6A to 6B, 7A to 7B, 8A to 8B and 9 show a further exemplary embodiment of a vehicle seat assembly according to the invention with a resetting device, which includes a force transmission element 3 with a flexible traction means, here in the form of a chain 31, and a spring element in the form of a torsion bar spring 4.

The chain 31 of the design variant of FIGS. 5A to 9 here also is articulated to a bearing point LS on the adapter part 2 via a connecting piece not shown for the sake of simplicity, which adapter part is rigidly connected with the backrest L. When the backrest L is folded forwards or when the backrest L is pivoted backwards from a neutral position, an end of the chain 31 is entrained and the same is unwound from a winding element, here in the form of a winding disk 32. The winding disk 32 is rigidly connected with a coupling part 33, on which the end piece 43 of the torsion bar spring 4 is held. The coupling part 33 non-rotatably connected with the winding disk 32 or integrally formed therewith hence rotates the end piece 43 of the torsion bar spring 4 when the winding disk 32 is rotated about the axis of rotation C. Since the torsion bar spring 4 is immovably fixed at an opposite side part ST* of the seat substructure U, the torsion bar spring 4 is twisted and hence a resetting force is built up by means of such a rotation of the end piece 43 fixed at the coupling part 33. At its immovably fixed end, the torsion bar spring 4 likewise forms an end piece 44 in the form of a rod end bent over to form a loop. This end piece 44 is positively accommodated in a locating bearing FL of the side part ST*, as is also illustrated in the detail representation of FIG. 5C on an enlarged scale.

As is shown in particular in the detail representation of FIG. 5B, the end piece 43 of the torsion bar spring 4 held at the coupling part 32 just like the winding disk 32 firmly connected therewith, which is engaged by the chain 31, here is accommodated within a sleeve 7. This sleeve 7 fixed on the inside of the side part ST for example serves the connection with the transverse tube Q. In this way, the torsion bar spring 4 here as well can be accommodated completely in a transverse tube Q extending between the two side parts ST and ST* transversely to a longitudinal direction of the seat. To provide for a connection of the chain 31 held at the winding disk 32 with the adapter part 2, the sleeve 7 includes a cutout 70. Through this cutout the chain 31 extends from the interior of the sleeve 7 to the adapter part 2 and the adapter nose 20 formed thereon, which defines the bearing point LS.

To achieve that the chain 31 causes a rotation of the winding disk 32 and hence tensioning of the torsion bar spring 4, when the backrest L is folded forwards or pivoted backwards from the neutral position shown in FIGS. 6A and 6B, the winding disk 32 is provided with a toothing 320. By means of this toothing 320 extending over at least half of the circumference of the winding disk 32, a positive connection with several chain links 310 of the chain 31 is provided, when the chain 31 with at least one chain portion 3b is wound up on the winding disk 32 in the neutral position of the backrest L. As the backrest L is adjustable by a maximum of 120°, here by about 110°, with respect to the seat substructure U from a position inclined maximally backwards into the cargo position maximally folded forwards, the toothing 320 of the winding disk 32 only extends over a part of the circumference, in order to save costs and installation space.

In the neutral position of FIGS. 6A and 6B, the toothing 320 of the winding disk 32 with several teeth engages into several chain links 310 of the chain 31. A chain portion 3b wound up on the winding disk 32 thus in several respects is positively connected with the winding disk 32. From the wound chain portion 3b, a further chain portion 3a extends substantially linearly away from the winding disk 32 in direction of the adapter part 2. When the backrest L now is folded forwards into the cargo position along the swivel direction V1 corresponding to FIGS. 7A and 7B, the chain 31 is unwound from the winding disk 32 and by the tooth engagement of the toothing 320 into the chain links 310 drives the winding disk 32 to rotate about the axis of rotation C in the direction of rotation D1. The same applies for pivoting of the backrest L backwards along the swivel direction V2 proceeding from the neutral position shown in FIGS. 6A and 6B, for example into a rearmost comfort position, as it is shown in FIGS. 8A and 8B. In both cases, the winding disk 32 is rotated via the chain 31 and the torsion bar spring 4 thereby is twisted, so that a resetting force thereby acts on the backrest L in direction of the neutral position.

In so far, the mode of operation of a resetting device according to the design variant of FIGS. 5A to 9 is identical to the above-described design variants with a traction cable as part of the force transmission element 3. As compared to the solution with a traction cable, the use of a chain 31 however offers the advantage that in its wound condition the same can act on the toothed winding disk 32 like a lever. Via the stretched chain portion 3a the chain 31 furthermore in particular acts like a cable both in the cargo position of the backrest L maximally folded forwards and in the comfort position of the backrest L maximally pivoted backwards. Furthermore, a chain is distinctly more robust than a traction cable and thus can withstand greater loads.

As also in the exemplary embodiments explained above, the torsion bar spring 4 always is tensioned by only rotating the winding disk 32 along the direction of rotation D1 about the axis of rotation C and relaxed again by rotating into the opposite direction D2. Thus, the torsion bar spring 4 is loaded only dynamically and not alternatingly over the entire admissible range of adjustment of the backrest L about the pivot axis A.

To achieve an advantageous course of the torque on the torsion bar spring 4 and to achieve a rather uniform course of a resistance force acting against the adjustment of the backrest L by a user, which is applied by the torsion bar spring 4 to be tensioned, the winding disk 32 here is formed with a winding region defined by the toothing 32, which has a diameter varying along the circumference of the winding disk 32. The diameter of the winding disk 32 varies along that direction of rotation D1 in which the winding disk 32 is rotated when the backrest L is adjusted from the neutral position. In this way, teeth 3201 to 3204 of the toothing 320 radially protrude from the winding disk 32 with different distances to the axis of rotation C and on the winding disk 32 the chain portion 3b of the chain 31 wound up in the neutral position does not extend along a circular line around the axis of rotation C, corresponding to FIG. 6A or 6B. Rather, the course of the wound chain portion 3b in the neutral position substantially follows the course of a portion of a narrowing spiral around the axis of rotation C. Correspondingly, the one end of the chain 31 fixed at the winding disk 32 is located in the region of the largest diameter of the winding region of the winding disk 32. Proceeding therefrom, the chain links 310 of the chain 31 extend along portions of the winding disk 32 with decreasing diameter, until the chain 31 transitions into the linearly extending chain portion 3a in direction of the adapter part 2. By means of the diameter varying in this way, unwinding of the chain 3 from the winding disks 32 results in the fact that when the backrest L is swiveled out of its neutral position, an effective lever length of the chain 31 is increased for the applied resetting force on the backrest L.

Figure 9:
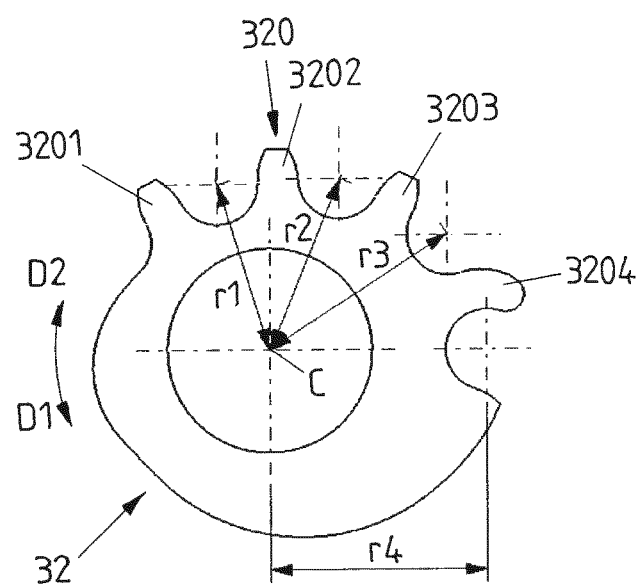
FIG. 9 shows a winding element of the vehicle seat assembly of FIGS. 5A to 8B in individual representations.

The configuration of the winding disk 32 is illustrated in detail in the side view of FIG. 9, in which the winding disk 32 is shown individually. In particular, this FIG. 9 shows that the winding disk 32 includes several form-fit elements in the form of several (here three) teeth 3201, 3202 and 3203 with identical tooth heights. These teeth 3201, 3202 and 3203 of the toothing 320 however are located at portions of the winding region with different diameters, so that the centers of the tooth flanks do not lie on a circular line around the axis of rotation C. Rather, the centers of the tooth flanks of the individual teeth 3201, 3202 and 3203 lie on a path around the axis of rotation C that deviates from a circular line. This is illustrated by means of different radii r1, r2 and r3, which each correspond to the distance of the center of a tooth flank of a tooth 3201, 3202 or 3203 to the axis of rotation C.

Part of the toothing 320 furthermore is a further (end) tooth 3204, whose tooth flank has the largest distance to the axis of rotation C corresponding to a radius r4. This tooth 3204 has a tooth shape different from the remaining teeth 3201 to 3203 and is slightly angled at its upper end opposite to the direction of rotation D1 (in direction of rotation D2). The (end) tooth 3204 thus provides for easier hanging in of an end of the chain 31 when the same is mounted on this tooth 3204. In addition, via an end-side chain link 310 of the chain 31, the chain 31 securely is positively and loadably held at the end tooth 3204 with its angled end also in the maximally stretched position of the chain 31, when the backrest L is in its cargo position or is maximally pivoted backwards, in order to be able to exert a tensile force on the backrest L in direction of its neutral position by means of the tensioned torsion bar spring 4 and the coupling part 33.

When using a (traction) cable instead of the chain 31, a winding roller also can be used analogous to the winding disk 32, whose radial dimensions vary along the circumference—possibly only locally—, and especially in a winding region on which a portion of the cable is wound up in the neutral position. The winding roller can be formed for example like a cam, in order to selectively influence the forces acting on the winding roller along the adjustment path of the backrest L and the corresponding lever conditions, analogous to the winding disk 32 with its stepped toothing 320.

Figure 10:
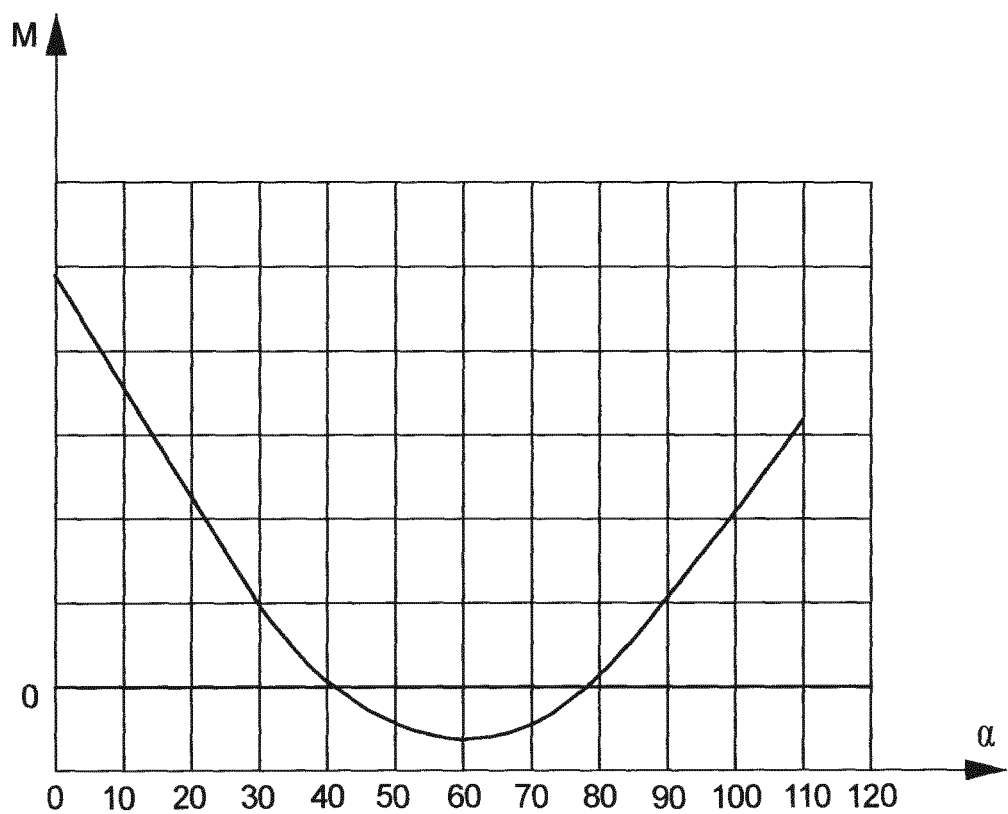
FIG. 10 shows a torque-angle diagram for illustration of a course of a torque over the angle of inclination of a backrest relative to a seat substructure, wherein the illustrated torque is applied to a spring element of a vehicle seat assembly designed according to the invention.

FIG. 10 by way of example illustrates the course of a torque generated on the torsion bar spring 4 over an angle of inclination a of the backrest L relative to the seat substructure U. An angle α=0° here corresponds to the comfort position of the backrest L inclined maximally backwards.

The diagram of FIG. 10 hence shows that in the variant illustrated by way of example the backrest L can be folded forwards into a cargo position by a maximum of 110°. Due to the resetting device designed according to the invention, the torque plotted over the angle α has a parabolic course and in the neutral position—here at about 60°—thus passes through a minimum.

For rotatably mounting the coupling part 33, on which the end piece 43 of the torsion bar spring 4 is held, an adapter plate in one embodiment can be fixed on the inside of the seat side part ST. This adapter plate then forms e.g. a bearing pin on which the coupling part 33 is rotatably mounted. The bearing pin for example centrally protrudes into the transverse tube Q, so that in this variant, too, the coupling part 33 and the torsion bar spring 4 can completely be accommodated within the transverse tube Q.

It is quite obvious that in contrast to the illustrated exemplary embodiments different shapes, in particular for the coupling part 33, are of course also conceivable. As regards the installation space it furthermore is regarded as advantageous to accommodate parts of the resetting device 1 within a load-bearing profile component, such as the transverse tube Q or a hollow profile at the backrest L, such as the housing G formed as crossbeam. However, this is not absolutely necessary. Furthermore, it is not absolutely necessary either that the bearing/rotation axis C for the torsion bar spring 4 extends parallel to the pivot axis A of the backrest L. The same for example also can extend vertically to the pivot axis A, and the torsion bar spring 4 for example can be accommodated in a longitudinal beam of the seat side part ST or the backrest L.

Moreover, it is provided in one design variant that instead of a torsion bar spring or torsion spring 4 a spiral spring is used, in which one end likewise is rotated about a middle or bearing axis for tensioning purposes.

LIST OF REFERENCE NUMERALS 1 resetting device
2 adapter part
20 adapter nose
3 force transmission element
3a, 3b chain portion
30 connecting piece
31 traction cable/chain (flexible traction means)
310 chain link
32 winding roller/winding disk (winding element)
320 toothing
3201-3204 tooth (form-fit elements)
33 coupling part
330 spring receptacle
331 bearing portion
34 bearing bolt
35 locking ring
4 torsion bar spring (spring element)
43, 44 end piece
7 sleeve
70 cutout
A pivot axis
B fitting
C bearing/rotation axis
D1, D2 direction of rotation
F spring mat (seat suspension element)
FL locating bearing
G housing
L backrest
LS bearing point r1-r4 radius
Q transverse tube
S vehicle seat
ST, ST* side part
U seat substructure
V1, V2 swivel direction
α angle

The invention claimed is:

1. A vehicle seat assembly, comprising a first seat component and a second seat component of a vehicle seat, wherein the second seat component is adjustable relative to the first seat component and a resetting device is provided, by means of which a resetting force is exerted on the second seat component in the direction of a neutral position, when the second seat component is adjusted with respect to the neutral position, wherein the resetting device includes at least the following:
- a spring element, in which a portion is rotated about an axis of rotation when the second seat component is adjusted with respect to its neutral position and the spring element thereby is tensioned, so that via the tensioned spring element at least a part of the resetting force is provided, and
- a force transmission element which is equipped to transmit an adjusting force during an adjusting movement of the second seat component out of its neutral position, in order to rotate and thereby tension the portion of the spring element about the axis of rotation, wherein the force transmission element and the spring element are formed and coupled with each other such that the spring element is dynamically loaded when the second seat component is adjusted beyond the neutral position, wherein
- the force transmission element is coupled with a winding element of the resetting device that is rotatably mounted about the axis of rotation and connected with the spring element, via which an adjusting force can be transmitted from the force transmission element to the spring element and which a resetting force can be transmitted from the spring element to the force transmission element, and
- on the winding element connected with the spring element a portion of a flexible traction means of the force transmission element is wound up at least in the neutral position of the second seat component.

2. The vehicle seat assembly according to claim 1, wherein the second seat component is adjustable out of its neutral position in two opposite adjustment directions and the at least one force transmission element and the spring element are formed and coupled with each other such that by means of the resetting device a resetting force is exerted on the second seat component in the direction of the neutral position, both when the second seat component is adjusted from the neutral position in the one adjustment direction and when the second seat component is adjusted from the neutral position in the other adjustment direction.

3. The vehicle seat assembly according to claim 2, wherein the force transmission element and the spring element are formed and coupled with each other such that a portion of the spring element always is rotated about the axis of rotation in the same direction of rotation and thereby is tensioned, independent of whether the second seat component is adjusted from the neutral position in the one or in the other adjustment direction.

4. The vehicle seat assembly according to claim 1, wherein the second seat component is pivotable about a pivot axis relative to the first seat component and the axis of rotation of the spring element does not coincide with the pivot axis.

5. The vehicle seat assembly according to claim 1, wherein the flexible traction means is a cable or a chain.

6. The vehicle seat assembly according to claim 1, wherein the winding element includes a winding region extending along a circumference of the winding element, against which a portion of the flexible traction means rests, which is wound up in the neutral position of the seat component, and which is formed such that the portion wound up thereon does not extend along a circular line around the axis of rotation.

7. The vehicle seat assembly according to claim 1, wherein the winding element includes a winding region extending along a circumference of the winding element, against which a portion of the flexible traction means rests, which is wound up in the neutral position of the seat component, and the winding element has a diameter varying along the circumference at least in the winding region.

8. The vehicle seat assembly according to claim 7, wherein at least in the winding region the winding element has a diameter which decreases along a direction of rotation in which the winding element is rotated, when the second seat component is adjusted with respect to the neutral position.

9. The vehicle seat assembly according to claim 1, wherein the winding element includes at least two form-fit elements for a positive connection with a chain portion of a flexible traction means formed as chain, which is wound up on the winding element.

10. The vehicle seat assembly according to claim 9, wherein at least one form-fit element is formed by a tooth of a toothing provided on a circumference of the winding element.

11. The vehicle seat assembly according to claim 10, wherein the toothing includes teeth with different distances to the axis of rotation of the winding element.

12. The vehicle seat assembly according to claim 1, wherein the spring element is at least partly accommodated in a transverse tube which extends between two seat side parts of a seat substructure of the vehicle seat.

13. The vehicle seat assembly according to claim 1, wherein the spring element is arranged on a backrest of the vehicle seat.

14. The vehicle seat assembly according to claim 13, wherein the spring element is arranged on an inside of the backrest.

15. The vehicle seat assembly according to claim 1, wherein the force transmission element is articulated to a bearing point of one of the two seat components.

16. The vehicle seat assembly according to claim 15, wherein the force transmission element is articulated to a component defining the bearing point, which also is adjusted during an adjusting movement of the second seat component.

17. The vehicle seat assembly according to claim 16, wherein the force transmission element is articulated to a component defining the bearing point, which is immovably fixed on the first seat component.

18. The vehicle seat assembly according to claim 1, wherein the force transmission element is articulated in the region of a fitting via which a backrest of the vehicle seat, as second seat component, is pivotally mounted on a seat substructure of the vehicle seat, as first seat component.

19. The vehicle seat assembly according to claim 1, wherein the spring element comprises a torsion bar spring or a spiral spring.

\* \* \* \* \*